Sept. 28, 1943.　　　S. DU PONT ET AL　　　2,330,341

MOTORCYCLE SADDLE

Filed July 23, 1942

INVENTORS
STEPHEN DU PONT AND
BY BENJAMIN B. DU PONT
Chapin & Neal
ATTORNEYS

Patented Sept. 28, 1943

2,330,341

UNITED STATES PATENT OFFICE 2,330,341

MOTORCYCLE SADDLE

Stephen Du Pont, Wilbraham, Mass., and Benjamin B. Du Pont, Montchanin, Del., assignors to Indian Motocycle Company, Springfield, Mass., a corporation of Massachusetts Application July 23, 1942, Serial No. 451,986

3 Claims. (Cl. 180—35)

This invention relates to improvements in saddles for use on motorcycles and has for its object the provision of greater comfort and security for the rider as well as an improved appearance of the saddle according to modern streamline standards.

The usual posture of a motorcycle rider is somewhat similar to that of a horse jockey in that the legs are bent at the knees to bring the thighs to an almost horizontal position and the lower legs in almost vertical position. The shape, structure, and mounting of the present saddle are therefore designed to make this characteristic position of the rider more secure by providing a good grip for the knees such as a jockey enjoys in riding a horse. In carrying out the objects of the invention as aforesaid, the pommel portion of the saddle is extended forward to embrace and fair into the rear end portion of the fuel tank of the motorcycle, which in the usual construction is mounted on the upper frame bar of the cycle and extends rearwardly to a point adjacent the forward end of the saddle. The rear part of the fuel tank is preferably made narrow enough for a good grip by the rider's knees.

It is customary in the mounting of motorcycle saddles to have the forepart pivoted on the cycle frame and the rear part spring-supported from the frame. We have found it desirable, therefore, in improving the riding characteristics of the saddle to provide that the pivotal axis of its forward end mounting shall be, for the average size rider, approximately coincident with the knee joint of said rider when in position on the saddle. Furthermore, in order to improve the possibilities for the knee gripping action of the rider, there are provided in the present improved saddle, jockey extensions from the pommel of flexible padded material which cover the ends of the pivotal axis of the saddle and serve as good gripping portions for the knees.

Other objects and advantages of the invention will be apparent from the accompanying drawing which shows a preferred embodiment of the invention and in which Fig. 1 is a side view of a motorcycle showing the improved saddle and fuel tank combination mounted thereon;

Figure 1:
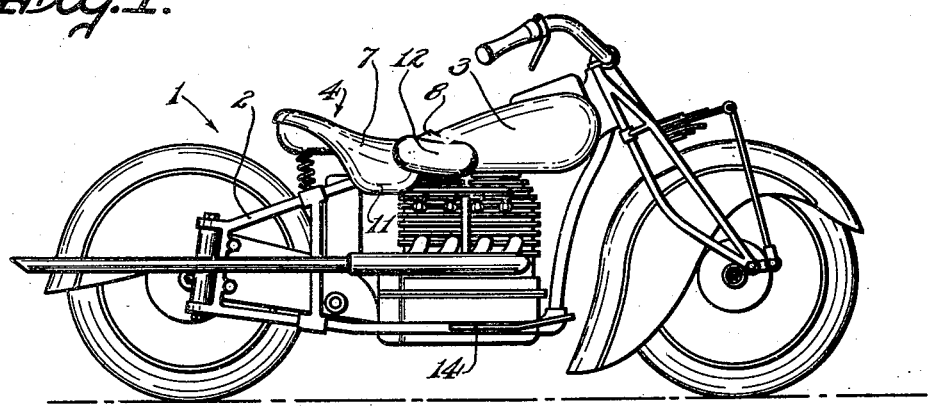
Figure 2:
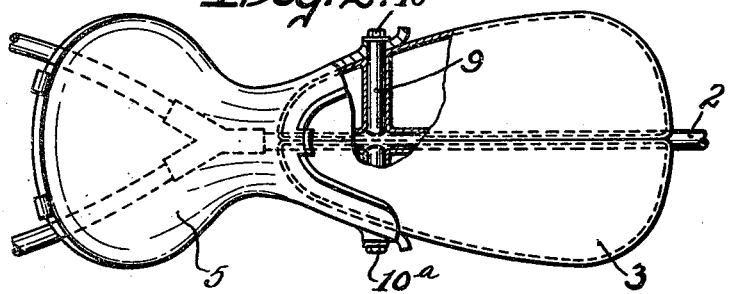
Fig. 2 is an enlarged plan view of the saddle frame with the saddle top removed and fuel tank partly broken away at one portion to show the pivotal mount for the saddle frame.

Referring more particularly to the drawing, the motorcycle is indicated generally at 1 and it is understood that in this view only the principal parts of a motorcycle are shown for the purposes of illustrating the association therewith of the combined saddle and fuel tank which constitute the subject matter of the present invention. The upper frame bar of the motorcycle is indicated at 2 and mounted on this frame bar in the usual manner is the fuel tank 3. As shown in Fig. 2, this fuel tank may if desired be constructed in two separate sections one on each side of said main frame bar 2.

Figure 3:
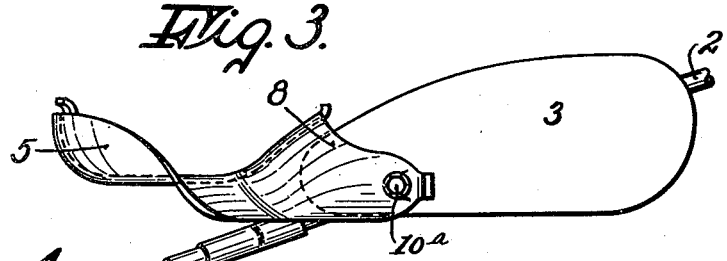
Fig. 3 is an enlarged side view of the parts shown in Fig. 2.
Figure 4:
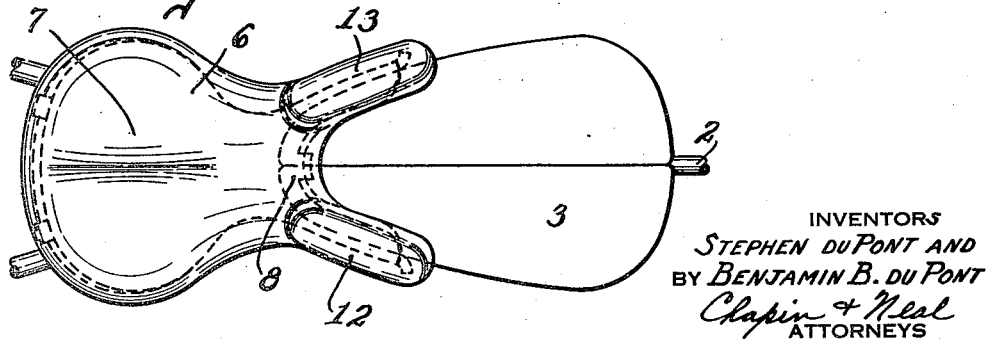
Fig. 4 is an enlarged plan view of the saddle and fuel tank with the saddle top in place.

The saddle as a whole is indicated at 4. As shown in Figs. 2 and 3 it comprises an underlying frame 5 which may be of metal or other suitable rigid material shaped in such a manner as to support thereon a saddle top of flexible material indicated at 6 and therewith constitute what is generally known as the hammock type of saddle. The seat portion of this saddle is indicated at 7 and the pommel portion at 8.

As shown in Figs. 2 and 3, the forward end of the saddle frame 5 is pivoted to the main frame bar 2 by a pintle 9 which extends transversely through the fuel tank 3. The pintle 9 is of course sealed from the fuel tank and is fastened in position by nuts 10 and 10a. The saddle top 6 may be suitably made from some flexible rubber-like or leather-like material having sufficient tensile strength to support the weight of the rider in a suspended hammock-like manner from the frame 5. The saddle top has depending from each side of its seat portion 7, the side portions 11, and also extending forwardly and downwardly from each side of the pommel 8 are padded portions serving as jockeys 12 and 13, one at each side of the fuel tank 3, said padded jockeys being arranged to cover the ends 10 and 10a of the pintle 9. The foot rest of the motorcycle is indicated at 14.

It will be understood that the rider when seated on the saddle will have his bent knees resting against the jockeys 12 and 13 at each side of the fuel tank whereby there will be something substantial to grip against for steadying himself upon the machine over jolts and jounces. Also the steadiness of the rider's position will be increased by the fact that the pivotal axis of the saddle at 9 is approximately coincident with the knee joints of the rider whereby he can stick more firmly to the saddle in its up and down movement.

Another feature of the improvement which will be apparent is that the forward end of the saddle is shaped and contoured so that it merges and fairs into the rear end fuel tank in a manner to give a streamline appearance to the assembly.

We claim:

1. The combination with a motorcycle having a fuel tank mounted along its upper frame bar, of a saddle comprising an underlying frame pivotally mounted at its forward end on said upper frame bar, and a saddle top on said saddle frame arranged to provide a seat portion and a pommel portion, said pommel portion having forwardly extending side portions in the form of knee pads at each side of said fuel tank overlying the ends of the pivotal axis of said saddle frame.

2. The combination with a motorcycle having a fuel tank mounted along its upper frame bar, of a saddle comprising an underlying frame pivotally mounted at its forward end on said upper frame bar at an axis intersecting the rear end of said fuel tank, and a saddle top on said saddle frame arranged to provide a seat portion and a pommel portion, said pommel portion having forwardly extending side portions in the form of knee pads at each side of said fuel tank overlying the ends of the pivotal axis of said saddle frame.

3. The combination with a motorcycle having a fuel tank mounted along its upper frame bar, of a saddle comprising an underlying frame pivotally mounted at its forward end on said upper frame bar, at an axis intersecting the rear end of said fuel tank, and a saddle top on said saddle frame arranged to provide a seat portion and a pommel portion, said pommel portion being contoured in shape to fit around the rear end of said fuel tank and having forwardly extending side portions in the form of knee pads at each side of said fuel tank overlying the ends of the pivotal axis of said saddle frame.

STEPHEN DU PONT.
BENJAMIN B. DU PONT.